UNITED STATES PATENT OFFICE.

JOHN E. BAKER, OF YORK, PENNSYLVANIA.

MATERIAL FOR USE IN MAKING UP, REPAIRING, AND REPLACING LININGS, &c., OF METALLURGICAL FURNACES.

1,063,102.  Specification of Letters Patent.  Patented May 27, 1913.

No Drawing.  Application filed December 6, 1911.  Serial No. 664,302.

*To all whom it may concern:*

Be it known that I, JOHN E. BAKER, citizen of the United States, residing at York, in the county of York and State of Pennsylvania, have invented certain new and useful Improvements in Material for Use in Making Up, Repairing, and Replacing Linings, &c., of Metallurgical Furnaces, of which the following is a specification.

This invention relates to an improved material for use in making-up, repairing and replacing linings, bottoms and parts of metallurgical furnaces.

In the operation of metallurgical furnaces, especially those known as open hearth furnaces, it has been recognized that damaged parts of the linings and bottoms of such furnaces can be repaired while the furnace walls are in a heated condition, by the application to such damaged parts of dolomite. Dolomite in its raw state, that is, as it comes from the quarry, and after being crushed, has been used heretofore but has been ascertained to be objectionable for various causes well known to those skilled in the art. It has therefore been attempted, heretofore, to supply this material in a condition where the same is relieved largely of the contained volatiles, gases, etc. Up to the present, two methods of treating raw dolomite have been followed with a view of obtaining a product suitable for this purpose, namely, the cupola method and the rotary kiln method.

In the cupola method, as heretofore practised, the material has been placed in a cupola furnace, the furnace being charged with alternate layers of coke and raw dolomite rock. The heat generated drives off the carbonic acid gas and other volatile constituents to a great extent and the material is taken from the cupola furnace and reduced to the proper granulated form, such granulated form being usually of a size to pass through approximately a five-eighths or three-fourths of an inch opening or meshed screen. The product as thus produced had a number of objectionable characteristics some of which may be mentioned as impairment, owing to the presence of a fine or powdered material, coke, cinder, ash and the like, and a small percentage of volatiles. Furthermore, the product thus obtained was not of uniform character, owing to the fact that the raw rock placed in the cupola was required to be of comparatively large size to enable the proper draft through the cupola and the establishment of the required heat therein, so that the material when removed from the cupola and crushed to a size approximating three-fourths to five-eighths of an inch, was found to contain many granules which had not been relieved of all of the volatiles contained therein. By reason of this objection, when this material was shipped in bulk, it was found that it would, by reason of the lack of uniformity of the granules, absorb in transit, a considerable amount of moisture. This material has therefore met with objections on the part of the manufacturers, first, because it is not substantially free from volatiles, and second, because it contains some fine improperly burned materials which, when the product is used, escape through and into the checker work of the open hearth furnace and tend to destroy the brick of the checker work. In the rotary kiln method an attempt has been made to avoid these various objections by the employment of what is known as the rotary style of roasting kiln. I have found that the rotary kiln process of treating dolomite is useful in many particulars, but it has been impossible to treat the granular material thereby so as to relieve it of all the moisture and volatiles contained therein and at the same time to cause it to retain its best condition for sufficient length of time to render the product practical for all purposes. Furthermore, when it is attempted to remove the volatile matters from crushed raw dolomite by the rotary kiln process, the resultant product is very light and has been found for this reason to be more or less unsatisfactory. While, therefore, the rotary kiln method resulted in a product free from cinder or ash, yet, owing to the reasons above pointed out, the product produced thereby was not entirely satisfactory.

The present invention has for its object the production of a product of this character which will not be open to the objections heretofore suggested, and more specifically stated, of a clean product which is substantially free from fine foreign impurities; which is uniformly burned so that practically all objectionable volatiles are driven off; and which is so constituted that but a relatively small percentage of moisture will be absorbed thereby for a period of time well within the time required for shipment to remote parts of the country, and well within the time between shipment and date of use.

The present invention has for a further object the production of a product of this character which is much heavier, volume for volume, than any manufactured dolomite heretofore produced, thus rendering the product available for purposes for which it has heretofore been thought impossible to use dolomite.

One method of obtaining the improved material is as follows:—First crush the raw dolomite into lumps approximately two to four inches in diameter; charge the same into a cupola furnace of any approved type, alternating with layers of coke; firing the furnace; and then withdrawing the burned dolomite at intervals as in the old practice. I thereafter crush the burned dolomite with such coke or cinder as may have remained, in a suitable apparatus and screen the same through a screen of approximately five-eighths to three-fourths inches mesh. The raw dolomite is subjected in the cupola to a heat approximately 2800° F., from two to four hours and I find that as a result of subjecting the lumps of dolomite to this heat, they are shrunk or condensed to a marked degree, so much so that dolomite burned in the cupola in this manner will weigh considerable more than an equal volume of raw unburned dolomite notwithstanding the fact that much of the volatile matter has been expelled from the raw dolomite. The product thus produced has mixed with it a material percentage of ash, coke, and fine or dust material (the latter being objectionable in furnace practice). The material is also manifestly unequally burned owing to the fact that the size of the rock introduced into the furnace is required to be sufficient to permit the proper draft through the furnace, and therefore the interiors of these large masses of rock have been found to be improperly burned and to contain volatiles objectionable for the reasons heretofore stated. The crushed product with the objectionable materials and characteristics, I then preferably, without further treatment, subject to a second burning, conveniently by introducing the same directly into a rotary kiln, and by further subjecting the said product to a degree of heat approximately 2400° F., the coke and cinder constituents of the mass are consumed, the finer particles of dust are either fused or carried over into the up-take or otherwise eliminated by the draft. The dolomite granules are subjected to the requisite heat to drive off remaining volatiles which may be contained therein. In addition to relieving the granulated mass of the cinder, carbon and fine objectionable particles, by this process, I have also ascertained that the various granules which have been subjected to the burning action in the rotary kiln are rendered much less pervious to moisture than theretofore. This I attribute in a great measure to the fact that when the granules are burned in the rotary kiln, they are further shrunk or condensed, and I have found that the material after being treated in the rotary kiln in the manner above described, will volume for volume, weigh considerably more than either the raw dolomite stone or the dolomite after it has been roasted in the cupola. In fact, the material which is obtained from the rotary kiln is substantially volume for volume, as much heavier than the material obtained from the cupola, as the material obtained from the cupola is heavier than the raw dolomite, and the product which is obtained in this manner is almost twice as heavy, volume for volume, as the product which is obtained when it is endeavored to roast granulated dolomite in accordance with the rotary process. The product is also found to be substantially uniform in its physical characteristics. The fact that the material obtained by the present process is for a considerable period of time substantially impervious to moisture, may be also due in some measure to the presence of a small percentage of silicious materials contained in the coke which has been passed into the kiln with the roasted dolomite, and also to the fact that coke has been used in the cupola under the first step of the treatment.

While I have not ascertained definitely the exact causes from which the beneficial results above noted are obtained, I have found that the product will not for a considerable time, absorb any appreciable amount of moisture. In fact, I have found that shipments of this material can be delivered hundreds of miles distant and that for a period of twenty-five or thirty days the material will have absorbed no objectionable amount of moisture, whereas in the practice heretofore employed, the marketable material has been found to be of such a character as to very readily and quickly absorb moisture, so that during the shipment of the material from 10 to 15% of moisture would be absorbed before the material was used in the furnace. I am therefore able to supply the steel works with a material which is in substantially perfect condition for use, and, in fact, in a condition which has heretofore been commercially impossible. This will be apparent when it is understood that dolomite quarries are not ordinarily located in the immediate vicinities of steel works.

The granules of the completed product as far as I have been able to ascertain, are substantially uniform in character and they have a slightly silicious and dense outer surface part. To distinguish the product from that produced separately by either the cupola or rotary kiln processes, the same may be characterized as "double burned dolomite." So far as I am aware it is broadly new to double burn dolomite to obtain a product having the characteristics hereinbefore referred to and I desire to claim the same broadly.

As has been heretofore pointed out, the granules of my "double burned dolomite" are much denser than either the raw dolomite stone or any of the roasted dolomite heretofore known to the prior art, so that the present product will, volume for volume, weigh considerable more than any of the roasted dolomites in use at the present time. This characteristic of "double burned dolomite" is a very important one, as it enables the use of the material with good results, because of its dense character, for closing the tap holes in furnaces and also for building up bottoms. The importance of this will be apparent as it enables the use of the "double burned dolomite" which I have produced, for purposes in connection with which it has heretofore been found impractical to use dolomite and for which it has been necessary to use magnesite, which must be imported and is very expensive.

While a convenient method of obtaining the improved product is herein set forth, it will be understood that the invention is not restricted to the use of any particular method.

What I claim is:—

1. As a new article of manufacture, double burned dolomite in the form of a granulated mass, the particles of which are of such of a substantially uniform physical character as to render the same slow to absorb moisture.

2. As a new article of manufacture, burned dolomite in the form of a granulated mass, the particles of which are uniformly substantially free from volatiles and of such a uniform physical character as to render the same slow to absorb moisture.

3. As a new article of manufacture, burned dolomite in the form of a granulated mass, the particles of which are uniformly substantially free from volatiles and are uniformly condensed rendering the same slow to absorb moisture.

4. As a new article of manufacture, burned dolomite in the form of a granulated mass, substantially all of the particles of which are uniformly condensed rendering the same slow to absorb moisture.

5. As a new article of manufacture, a material for repairing furnace linings and the like consisting of a mass of burned broken dolomite rock, the constituent members of which have a substantially uniformly condensed surface part, the mass being substantially free from cinder.

6. As a new article of manufacture for repairing furnace linings and the like, a granulated mass of double burned dolomite of a uniform condensed physical character to render the same slow to absorb moisture.

7. A new article of manufacture for repairing furnace linings and the like consisting of a granulated mass of double burned dolomite, the various particles of which have a moisture repelling surface part and of a substantially uniform physical character.

In testimony whereof I affix my signature in presence of two witnesses.

JOHN E. BAKER.

Witnesses:
S. D. WAREHEIM,
FREDERICK B. GURLEY.